United States Patent
Kemp et al.

(10) Patent No.: US 8,831,761 B2
(45) Date of Patent: Sep. 9, 2014

(54) METHOD FOR DETERMINING A PROCESSED AUDIO SIGNAL AND A HANDHELD DEVICE

(75) Inventors: Thomas Kemp, Esslingen (DE); Altfried Dilly, Stuttgart (DE)

(73) Assignee: SONY Corporation, Tokyo (JP)

( * ) Notice: Subject to any disclaimer, the term of this patent is extended or adjusted under 35 U.S.C. 154(b) by 295 days.

(21) Appl. No.: 13/105,263

(22) Filed: May 11, 2011

(65) Prior Publication Data

US 2011/0301730 A1    Dec. 8, 2011

(30) Foreign Application Priority Data

Jun. 2, 2010   (EP) ..................................... 10005770

(51) Int. Cl.
| | |
|---|---|
| H04M 3/56 | (2006.01) |
| H04M 1/60 | (2006.01) |
| G10L 19/008 | (2013.01) |
| H04R 1/40 | (2006.01) |
| H04W 84/18 | (2009.01) |
| H04M 1/725 | (2006.01) |
| G10L 21/0216 | (2013.01) |

(52) U.S. Cl.
CPC ................. H04M 1/60 (2013.01); *H04W 84/18* (2013.01); G10L 19/008 (2013.01); *H04M 1/72591* (2013.01); *G10L 2021/02166* (2013.01)
USPC ........... 700/94; 381/92; 370/260; 379/202.01

(58) Field of Classification Search
CPC .......... G10H 1/0058; G10H 2220/101; G10H 2240/251; G10H 2240/205; H04N 7/152; A61B 2562/0219; G06F 17/3087; G10L 2021/02166; H04R 3/005
See application file for complete search history.

(56) References Cited

U.S. PATENT DOCUMENTS 6,975,991 B2 * 12/2005 Basson et al. ................. 704/271
7,035,416 B2    4/2006 Matsuo
7,433,327 B2 * 10/2008 Harville et al. ............... 370/260

(Continued)

FOREIGN PATENT DOCUMENTS

WO   WO 2007/017810 A2   2/2007

OTHER PUBLICATIONS

Niall Cahill, et al., "Speech Source Enhancement using a Modified ADRess Algorithm for Applications in Mobile Communications", Audio Engineering Society, AES E-Library, http://www.aes.org/e-lib/browse.cfm?elib=13795, Oct. 2006, 1 page.

(Continued)

*Primary Examiner* — Curtis Kuntz
*Assistant Examiner* — Thomas Maung
(74) *Attorney, Agent, or Firm* — Oblon, Spivak, McClelland, Maier & Neustadt, L.L.P.

(57) ABSTRACT

A method for determining a processed audio signal, comprising: establishing an ad-hoc network between a plurality of handheld devices, each handheld device having a microphone; picking up a plurality of audio signals with each microphone of the plurality of handheld devices; distributing the plurality of audio signals within the ad-hoc network such that in at least one handheld device at least two of the plurality of audio signals are available; combining, in said at least one handheld device, the at least two of the plurality of audio signals to obtain said processed audio signal.

15 Claims, 5 Drawing Sheets

(56) References Cited

U.S. PATENT DOCUMENTS

| | | | |
|---|---|---|---|
| 2007/0035612 A1* | 2/2007 | Korneluk et al. | 348/14.01 |
| 2007/0137462 A1* | 6/2007 | Barros et al. | 84/453 |
| 2009/0118849 A1* | 5/2009 | Dery et al. | 700/94 |
| 2009/0264114 A1* | 10/2009 | Virolainen et al. | 455/416 |
| 2009/0296966 A1 | 12/2009 | Cheung | |
| 2012/0163606 A1* | 6/2012 | Eronen et al. | 381/22 |
| 2012/0288126 A1* | 11/2012 | Karkkainen et al. | 381/309 |

OTHER PUBLICATIONS

Giso Grimm, et al., "The Personal Hearing System—A Software Hearing Aid for a Personal Communication System", EURASIP Journal on Advances in Signal Processing, Hindawi Publishing Corporation, http://www.hindawi.com/journals/asp/2009/591921.html, 2009, 8 pages.

Patrick M. Peterson, Adaptive Array Processing for Multiple Microphone Hearing Aids, RLE Technical Report No. 541, Feb. 1989, 126 pages.

* cited by examiner

METHOD FOR DETERMINING A PROCESSED AUDIO SIGNAL AND A HANDHELD DEVICE

An embodiment of the invention relates to a method for determining a processed audio signal. A further embodiment of the invention relates to a handheld device. A still further embodiment relates to a system adapted to determine a processed audio signal.

BACKGROUND

Many audio applications are based on picking up audio signals and processing the signals to deliver a processed audio signal.

BRIEF SUMMARY

It is an object of the invention to provide a method for determining an improved processed audio signal. It is a further object of the invention to provide a handheld device being capable of determining an improved processed audio signal. A further object is to provide a respective system.

These objects are solved by methods, a handheld device and a system according to the independent claims.

Further details of the invention will become apparent from a consideration of the drawings and ensuing description.

BRIEF DESCRIPTION OF THE SEVERAL VIEWS OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following, embodiments of the invention are described. It is important to note, that all described embodiments in the following may be combined in any way, i.e. there is no limitation that certain described embodiments may not be combined with others. Further, it should be noted that same reference signs throughout the figures denote same or similar elements.

It is to be understood that other embodiments may be utilized and structural or logical changes may be made without departing from the scope of the invention. The following detailed description, therefore, is not to be taken in a limiting sense, and the scope of the present invention is defined by the appended claims.

It is to be understood that the features of the various embodiments described herein may be combined with each other, unless specifically noted otherwise.

Figure 1:
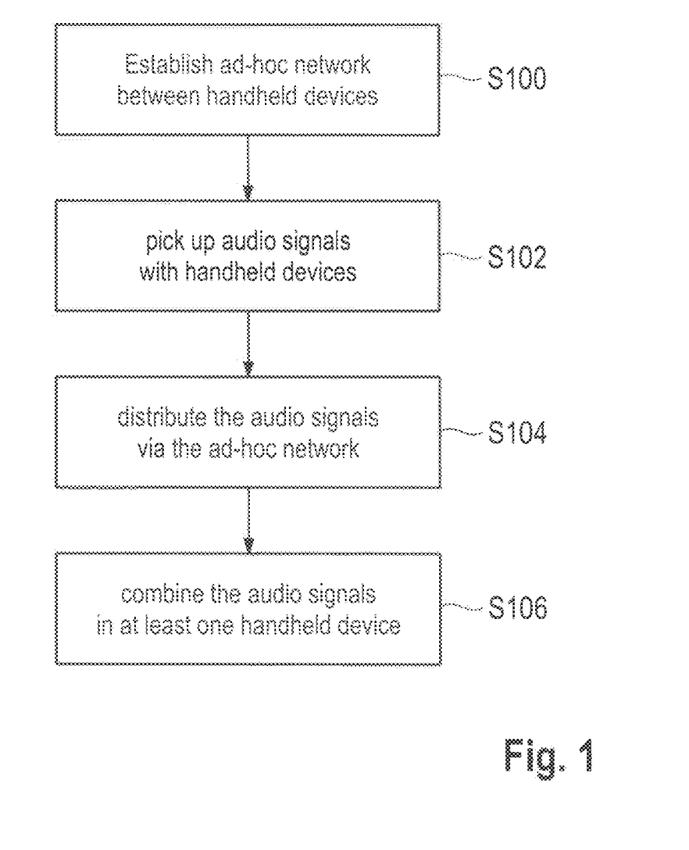
FIG. 1 shows a block diagram of an embodiment of the method for determining a processed audio signal.

In FIG. 1 at S100, an ad-hoc network is established between a plurality of handheld devices such as e.g. smartphones, PDA's and portable computers. Each of the handheld devices may have a microphone adapted to pick up audio signals.

Each of the handheld devices may e.g. run a predefined application enabling the establishment of the ad-hoc network. In case the handheld devices or at least some of the handheld devices are smartphones or other suitable cellular phones the ad-hoc network may be established by a respective application. In the smartphone environment such an application may be referred to as "App".

Once the respective application is running on the handheld devices a user of one of the handheld devices may establish the ad-hoc network by pushing a respective button or the like on a user interface of the handheld devices. By doing so the handheld device of this particular user may request the other handheld devices to establish respective connections with the handheld device of this particular user.

As seen at S102 in FIG. 1, audio signals may then be picked up with the microphones of the plurality of handheld devices connected with each other via the ad-hoc network. Since the handheld devices will be located at different locations, e.g. in a room, the microphones of the plurality of handheld devices will form a microphone array.

Then, at S104 the picked up audio signals may be distributed via the ad-hoc network. The distribution may be such that each of the handheld devices receives all of the audio signals respectively picked up at the microphones of each of the handheld devices. Alternatively, it is also possible to limit the number of handheld devices to which the picked up audio signals are distributed. For example, it may be sufficient that only one user, e.g. the user that initiated the establishment of the ad-hoc network or another user that requests this, receives all of the audio signals at his handheld device. Whether a user wishes to receive the audio signals of each of the handheld devices may be controlled via the application running on the handheld device. Also, it may not be necessary that the users requesting to receive audio signals picked up at other handheld devices receive all of the audio signals. For example, it may be sufficient if a requesting user only receives one further audio signal such that he has at least two audio signals available, i.e. the audio signal he picked up himself with his microphone/handheld device and the audio signal of one further handheld device. Which signals are transmitted to a requesting user may depend on e.g. the quality of the audio signals, SNRs, a beamforming algorithm (see also below), the available band width in the ad-hoc network and/or the kind of application the user is currently running on his handheld device. For example, for a stereo recording it may be sufficient to have only two audio signals available whereas for recording sound for a surround sound application and/or reproduction, more audio signals may be needed.

Thus, in a further embodiment it may also be possible that a handheld device selectively receives not all of the plurality of audio signals picked up at each of the microphones but only audio signals of certain selected microphones of the handheld devices. For example, it may be sufficient that only two sound signals of two microphones located close to a target sound source, e.g. a speaker, transmit (distribute) their sound signals to a certain handheld device.

As seen, according to the embodiment shown in FIG. 1, at S106 the audio signals are combined in at least one handheld device. This may be the handheld device that requested receiving other audio signals via the ad-hoc network. Thereby, a processed audio signal may be determined.

The processed audio signal may be improved with respect to the audio signal received at one handheld device since it included information of a plurality of audio signals which have been picked up by a plurality of microphones (microphone array). With such an arrangement it may be possible to determine a processed audio signal having a good signal to noise ratio (SNR). The SNR may be improved when compared to the SNR of signals which have been picked up by a single microphone only. The processed audio signal may also be a stereo audio signal or a surround sound signal including sound signals picked up at a plurality of positions.

Figure 2:
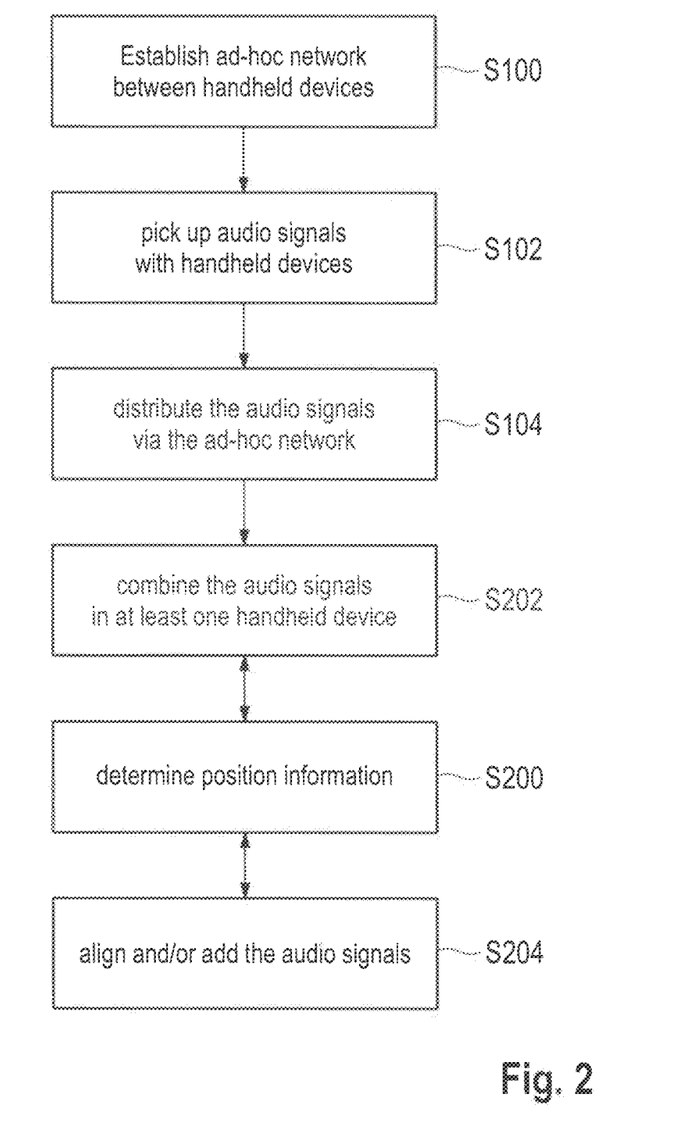
FIG. 2 shows a further embodiment of the method for determining a processed audio signal.

According to a further embodiment shown in FIG. 2 it may also be possible to determine position information as depicted at S200. If position information is available then the audio signals which are combined in the at least one handheld device, e.g. the handheld device of a user who requested to receive further audio signals, may be combined dependent on the position information as indicated by the arrow between boxes labeled with S202 and S200 in FIG. 2.

Further, it may also be possible that the audio signals may be aligned and/or added as indicated at S204. Also the aligning and/or adding may be dependent on the position information.

The position information may be determined as follows: together with the audio signals (microphone data) each application running on a handheld device connected to the ad-hoc network may also send its local time stamp. Then, in the beginning, all clocks may be synchronized to sample accuracy (e.g. for CD quality audio pick up $1/44100$ seconds is sufficient). After this, the audio signals may be aligned to each other. For example, if there is a strong noise (noise event) e.g. a beer glass falling on the floor or a loud laughter that signal is picked up by all microphones, and the signals may then be aligned to each other using this noise event. From the alignment, the difference of the distance from the sound source to each microphone pair can be derived using the common time. For example, if a first microphone detects the sound at t=22.500 ms and a second microphone detects this sound at 24.700 ms in this case the difference between the detection time is 2.200 ms indicating that the first microphone is 330 m/s×2.2 ms or 73 cm closer to the source than the second microphone.

As will be apparent to those skilled in the art with three microphones there are three distance measurements for every sound source (first vs. second sound source, first vs. third sound source and second vs. third sound source), but only two new unknown location parameters are introduced into the system for every new sound source (assuming all sound sources are in one plane). Therefore, if there is enough noise from enough different locations throughout and all noise is confined to a two-dimensional plane, the location of all microphones relative to each other can be determined. Additionally, with this geometry once known, the location of the sound sources relative to the three microphones may also be determined.

In case of completely unknown sound source locations four microphones may be helpful along with multiple measurements of noise events of multiple noise sources to determine the geometry. If only one single noise source shall be used that could require eight microphones or more. However, depending on the algorithms used for source location detection and/or depending on the availability of geometrical or other constraints, it may be possible to use less microphones.

In a further embodiment it may also be possible that every handheld device, e.g. smartphone, can emit a noise event by itself which can be used to determine the relative location to each other initially. If such calibration is allowable, again, four handheld devices/microphones may be sufficient to calibrate themselves relative to each other and determine the positions relative to each other, without the need of any external sound sources (noise events).

In any case, determining relative positions of handheld devices/microphones based on a noise event will be known to those in the art. Various algorithms from the prior art may be used to determine the relative distances of the handheld devices. Such algorithms generally rely on the fact that the Nth microphone will add N−1 new equations to the system (the distance differences from the source to other microphones), but add only 3 new unknowns (its own coordinates). Therefore, if there are enough microphones, the total geometry can be uniquely determined.

In a further embodiment, the relative locations may be checked regularly for modifications and be adapted/updated to reflect the current state. Users and, therefore, also the microphones of the handheld devices might change its locations (the user may walk around). Such movement may be detected with gyrosensors which may be included in the handheld devices.

According to a further embodiment, it may also be possible to select a target location, wherein the step of combining (cf. S202 in FIG. 2 and S106 in FIG. 1) includes a beamforming focusing the audio pick up to the selected target location.

For example in a room or open space there may be a target speaker speaking at the target location. Then, by using the microphone array established by the handheld devices beamforming techniques may be used to achieve an improved processed audio signal focusing on the target location (target speaker). This way, an improved signal to noise ratio (SNR) may be achieved. The beamforming may e.g. be realized since the microphone signals are delayed with respect to each other such that all sound from the target location is added in-phase and all sound from other locations is added in random phase. The phase-added signal may then be played to the user and/or recorded.

One application of such a handheld device may be for the hearing impaired. In fact, in situations where many people gather there may be considerable noise involved. Examples are meetings with many participants like conferences or cocktail parties. With the degradation of acoustic surrounding conditions, the communication may be hindered in various degrees both depending on the noise level and on the listening abilities of the individual. For the hearing impaired, the situation might become unmanageable fairly soon but in some circumstance even persons with normal hearing capabilities may have difficulties to communicate. As is apparent from the above, according to an embodiment of the invention, a target speaker may e.g. be picked out of the mixture of signals by beamforming two or more suitable, e.g. close, microphone signals thus achieving a greatly improved SNR.

The phase added signal (processed audio signal) may be played to the user, e.g. to a hearing impaired user, for example via an earplug. In an embodiment of the invention the earplug may be connected to the handheld device of the user via a cable. In a further embodiment the earplug may also be connected to the handheld device via a wireless connection. In case the hearing aid of a hearing impaired user supports wireless sound transmission, the handheld device may also establish a connection to the hearing aid the user usually uses.

Such wireless communication between a handheld device and a hearing aid may be done via a wireless body area network (WBAN).

It should also be noted that if no other smartphones (as an example of a handheld device) are in a room, the system may operate in a single microphone mode. In this mode it reflects the functionality of a traditional hearing aid. Since the quality of an ordinary cheap cell phone microphone might not be so good it may be recommendable that the hearing impaired user will utilize a special smartphone for himself, i.e. that a fallback mode provides a good hearing experience. Once additional smartphones with the proper application enabling establishing a connection via an ad-hoc network are found in the surrounding, the beamforming may take place. Thus, the quality of communication may be improved. The improvement will be greater if there are more smartphones (handheld devices) distributed in a room.

According to a further embodiment, the above-described methods may not only be used for the hearing impaired. Another application may enable to determine a processed audio signal corresponding to a surround sound signal. For example, if audio signals are picked up at various locations in a room, then this information may be used to control a respective playback device enabling surround sound reproduction.

Also, it may be possible to select two microphones of the microphone array to enable a stereo recording.

Thus, according to a further embodiment the handheld devices described above and below might be used for an improved audio pick up. Such pick up may be useful e.g. for recording music. For example in case of a concert, surround sound may be picked up and/or stereo sound.

In any case, having the recordings of sound at various locations available at a certain handheld device may be useful for many other applications.

As mentioned above, an embodiment of the invention may be based on applications running on the handheld devices. Such applications may be distributed easily via specialized market places. It may also be possible, however, to distribute the applications via the ad-hoc network to other handheld devices in a room. For example, one user may wish to establish an ad-hoc network and a microphone array. This user may then wish to receive the audio signals picked up at other handheld devices distributed in his surrounding. For being able to do this, the user may transfer the necessary application to the other users that he wished to include in the ad-hoc network. Thus, it may not be necessary that each of the individual users download/purchase the application. It may be sufficient that one user has the application on his handheld device and then distributes the application to other users of handheld devices in a room.

Of course, there is no limitation that the handheld devices need to be located in a room. Open air or other scenarios are possible.

Figure 3:
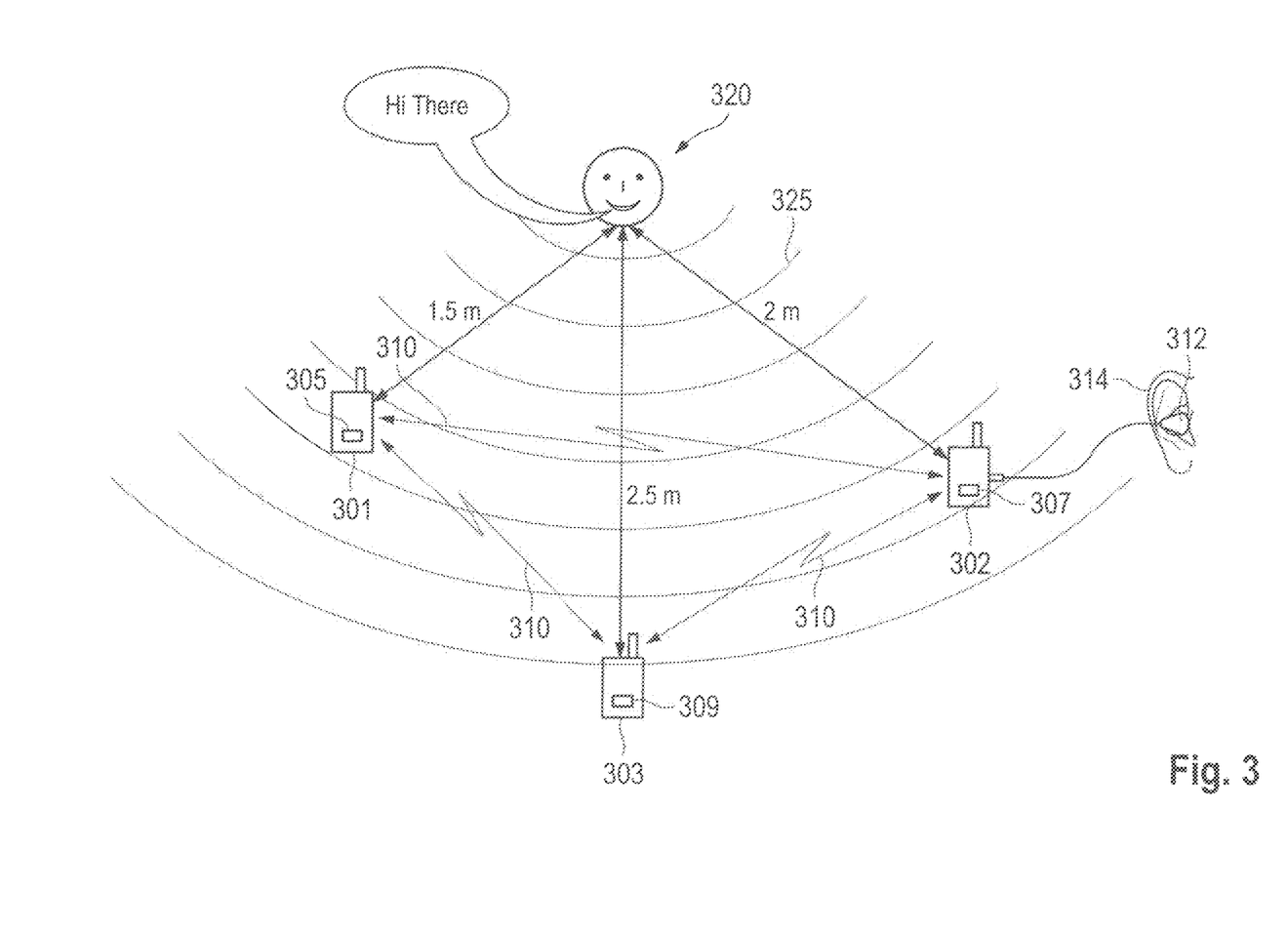
FIG. 3 shows an example for illustrating the method and respective handheld devices according to an embodiment of the invention.

FIG. 3 shows an example for illustrating a further embodiment of the invention. In this example three cellular phones (handheld devices) 301, 302 and 303 are connected by an ad-hoc network 310. The first cellular phone 301 comprises a first microphone 305. Further the second cellular phone 302 comprises a second microphone 307 and the third cellular phone 303 a third microphone 309.

In the example of FIG. 3, it is assumed that the user of the second cellular phone 302 is hearing impaired. He may therefore connect an earplug 312 to his cellular phone 302 and place the earplug 312 in his ear 314.

For determining an improved audio signal (processed audio signal) which will be reproduced by earplug 312, the user of the second cellular phone 302 may select a target location. For example, the user of the second cellular phone 302 may wish to hear a speaker 320 at a target location. An embodiment for selecting a target location will be described further below in connection with FIG. 5.

In the example of FIG. 3, it is assumed that the speaker 320 at the target location speaks a sentence "Hi there". Therefore, respective acoustic waves 325 are distributed via the air from his mouth to the microphones 305, 307 and 309 of the first to third cellular phones 301, 302, 303.

In FIG. 3, it is assumed that the first cellular phone 301 is 1.5 m away from speaker 320. Further the second cellular phone 302 has a distance of 2 m from the speaker 320 and the third cellular phone 303 has distance of 2.5 m from the speaker 320.

Therefore, the acoustic signals corresponding to the spoken sentence "Hi there" are picked up at the microphones 305, 307 and 309 at different times.

Figure 4:
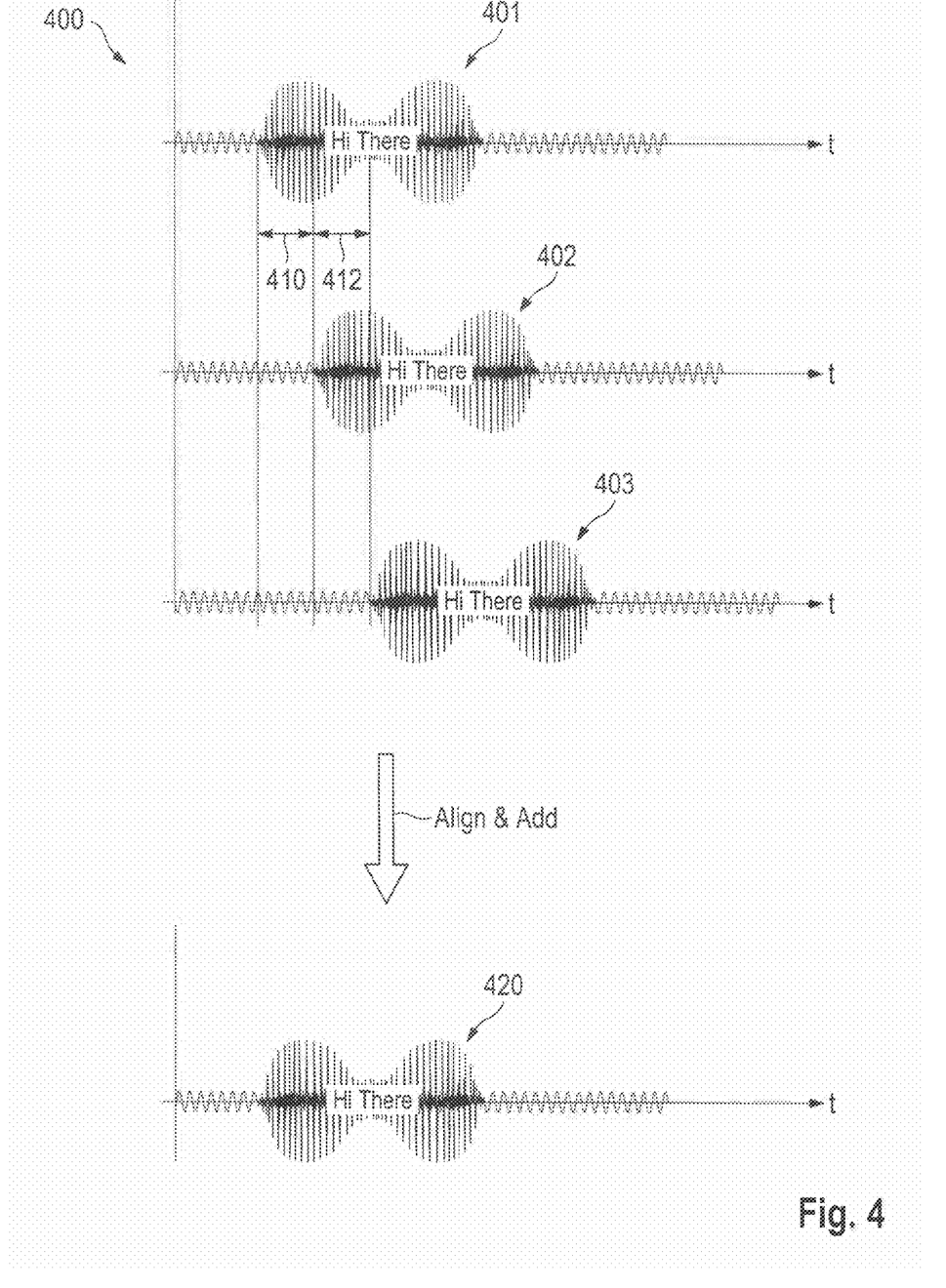
FIG. 4 shows a diagram for illustrating aligning and adding of audio signals to determine an improved processed audio signal according to an embodiment of the invention.

This is depicted in FIG. 4.

The upper diagram 400 in FIG. 4 shows three signals 401, 402, and 403. Signal 401 corresponds to the signal picked up by microphone 305 of the first cellular phone 301 in FIG. 3. Further, the second signal 402 corresponds to the signal picked up by microphone 307 of the second cellular phone 302 in FIG. 3. Still further, the third signal 403 corresponds to the signal picked up by microphone 309 of the third cellular phone 303 in FIG. 3.

As indicated by arrows 410 and 412, the signals 401, 402, and 403 are received at the different microphones/cellular phones with a certain delay caused by the different distances between the respective cellular phone and the speaker 320 as depicted in FIG. 3.

In order to obtain an improved (processed) audio signal, the three signals 401, 402, and 403 may be aligned and added. Thereby, a processed signal 420 may be obtained having an improved signal to noise ratio in comparison with either one of signals 401, 402, and 403.

The alignment may be based on position information of the cellular phones 301, 302, and 303 in FIG. 3. As explained above, such position information may indicate relative positions of the cellular phones 301, 302, 303 with respect to each other. Such relative distances may be determined based on noise events. As mentioned above, such noise events may e.g. be a beer glass falling on the ground or a loud laughter. In case no such noise event is available, or alternatively to using such a natural noise event, it may also be possible that one or all of the handheld devices generate an artificial noise event by omitting a respective sound. For example, the application on the handheld devices may trigger a short ring tone of one of the cellular phones. Of course, in order to obtain a higher precision, each of the cellular phones may in turn emit a respective sound signal.

In a further embodiment, it may also be possible that the noise event is in a frequency range which is not audible (or not very disturbing) to humans but which can be picked up by the microphones. Therefore, the alignment may be more precise and/or it may not disturb the users of such a system.

Figure 5:
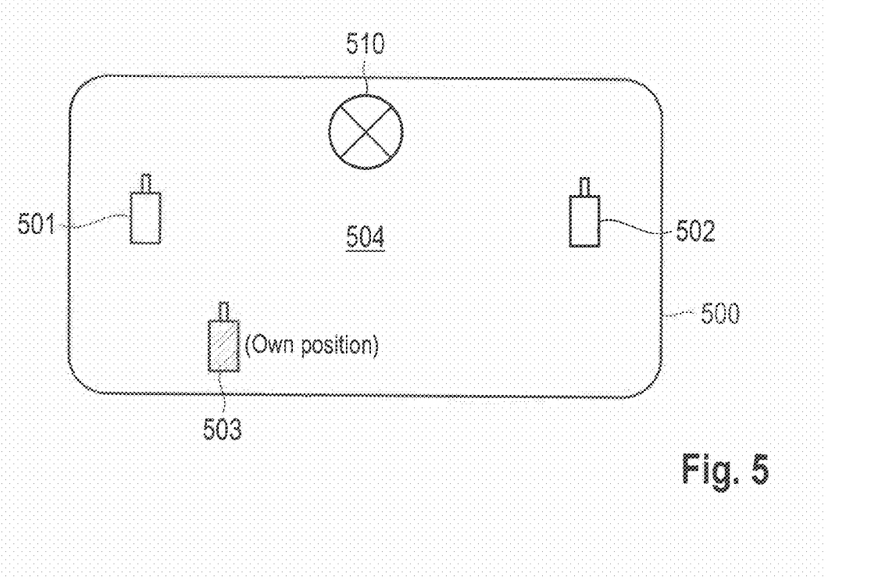
FIG. 5 shows a user interface of a handheld device according to an embodiment of the invention.

FIG. 5 shows an embodiment of a cellular phone 500 having a user interface 504. The user interface 504 may be based on using a touchscreen of cellular phone 500. In the user interface 504, the locations of cellular phones connected with cellular phone 500 via an ad-hoc network may be displayed at locations corresponding to the locations of the connected cellular phones. The own position of the user of cellular phone 500 may be indicated with a special symbol as depicted at 503. This may help the user to get a better orientation.

The user interface 504 may enable the user of cellular phone 500 to select a target location 510 by touching the touchscreen of cellular phone 500 at the respective position. For example, if the user of cellular phone 500 touches the screen at region 510 then the cellular phone 500 may output a processed audio signal based on a beamforming of the audio signals picked up at the cellular phones corresponding to the symbols 501, 502 and 503 shown on the touchscreen. When the user of cellular phone 500 received the audio signals from cellular phones corresponding to the symbols 501 and 502, he may determine a processed audio signal with a very good SNR of e.g. a speaker speaking at the target location.

In a further embodiment (not shown), the target location based on which a beamforming is performed may also be determined automatically. For example, if the system determines a region where speech from a single speaker is emitted, the beamforming may automatically take place to yield a processed signal focusing on the respective location.

Figure 6:
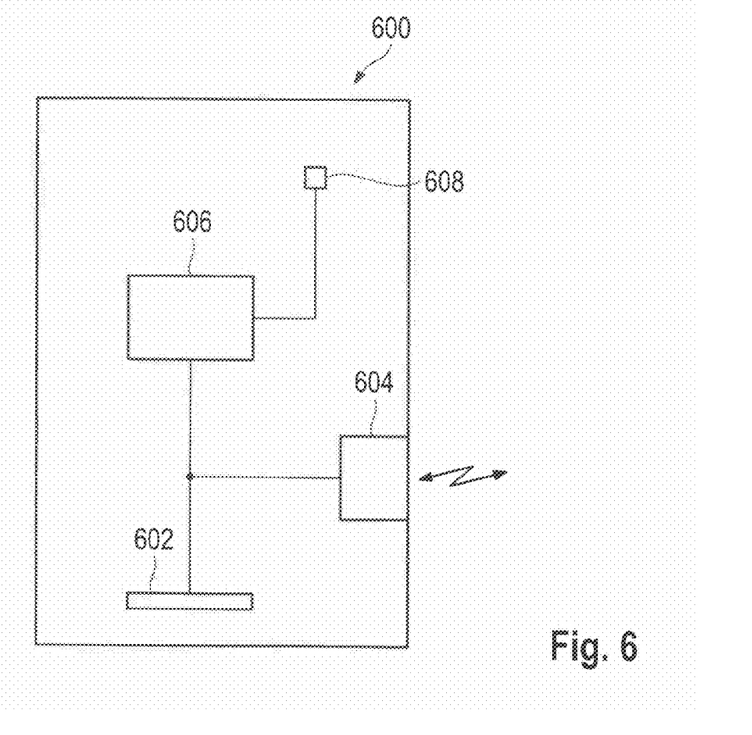
FIG. 6 shows an embodiment of a handheld device.

FIG. 6 shows a further embodiment of a handheld device 600. Handheld device 600 comprises a microphone 602, a wireless interface 604 and a microprocessor 606.

Microphone 602 may be adapted to pick up an audio signal. Further, wireless interface 604 may be adapted to communicate with at least one other handheld device via an ad-hoc-network, wherein the wireless interface 604 may further be adapted to receive at least one other audio signal having been picked up by said at least one other handheld device.

Further, microprocessor 606 may be adapted to combine the audio signal and the at least one other audio signal to obtain a processed audio signal.

Microprocessor 606 may further be adapted to determine position information and to combine the audio signal and the at least one other audio signal dependent on the position information.

Optionally, according to a further embodiment, cellular phone 600 may comprise a gyrosensor 608. The gyrosensor 608 may be used to update the position information. In other words, there may be several ways to determine the position information. One way is by using noise events which are detected/picked up by the other handheld devices connected to handheld device 600. Once this has been done, the gyrosensor 608 may be used as an additional source of information for updating the position information possibly in combination with further noise events. For example, if a user of handheld device 600 walks around, the gyrosensor 608 may detect this and send respective signals to microprocessor 606 which may then in turn update the position information.

As an additional source of information for enhancing the accuracy of the position information, it may also be possible to include information about the location which information has been derived from a satellite-based position determining system, such as GPS/dGPS or Galileo (the European satellite-based position determining system). For example, handheld device 600 may have a built-in position determining function and/or module (not shown). Then information determined by the position determining function and/or module may be used to determine the location information.

The invention claimed is:

1. A method for determining a processed audio signal, the method comprising:
  establishing an ad-hoc network between a plurality of handheld devices, each handheld device including a microphone;
  determining position information for each of the plurality of handheld devices;
  displaying on a display a location of each of the plurality of handheld devices based on the position information of each of the plurality of handheld devices;
  picking up a plurality of audio signals with each microphone of the plurality of handheld devices;
  displaying on the display a location of at least one source of the plurality of audio signals;
  selecting a target location from the displayed location of the at least one source;
  distributing the plurality of audio signals within the ad-hoc network such that at least two audio signals of the plurality of audio signals are available in at least one handheld device; and
  combining, in said at least one handheld device, the at least two of the plurality of audio signals by:
    beamforming the at least two of the plurality of audio signals to focus on the target location;
    aligning the at least two of the plurality of audio signals to a common reference point based on the position information of the plurality of handheld devices; and
    adding the at least two of the plurality of audio signals to obtain said processed audio signal.

2. The method of claim 1, wherein the position information is determined based on a noise event picked up by all of the plurality of handheld devices.

3. The method of claim 2, wherein the noise event is a noise emitted by one of the handheld devices.

4. The method of claim 1, wherein
  the at least one handheld device of the plurality of handheld devices includes a gyrosensor, and
  the gyrosensor regularly updates the position information of the at least one handheld device.

5. The method of claim 1, wherein the combining further includes signal processing such that the processed audio signal corresponds to a stereo audio signal based on the at least two of the plurality of audio signals.

6. The method of claim 1, wherein said processed audio signal corresponds to a surround sound signal.

7. The method of claim 1, wherein the handheld devices are cellular phones, and each runs an application configured to perform the method for determining a processed audio signal.

8. A handheld device comprising:
  a microphone configured to pick up an audio signal;
  a wireless interface configured to communicate with at least one other handheld device via an ad-hoc network and receive at least one other audio signal having been picked up by said at least one other handheld device;
  a display configured to display a location of the handheld device and the at least one other handheld device and to display a location of at least one source of the audio signal and the at least one other audio signal;
  a user interface configured to receive a target location from a user, the target location selected by the user from the displayed location of the at least one source; and
  a microprocessor configured to:
    determine position information of the handheld device and the at least one other handheld device; and
    combine the audio signal and the at least one other audio signal by:
      beamforming the audio signal and the at least one other audio signal to focus on the target location;
      aligning the audio signal and the at least one other audio signal to a common reference point based on the position information of the handheld device and the at least one other handheld device; and adding the plurality of audio signals to obtain a processed audio signal,
wherein the displayed location of the handheld device and the at least one other handheld device are based on the position information of the handheld device and the at least one other handheld device determined by the microprocessor.

9. A system configured to determine a processed audio signal, the system comprising:
a plurality of handheld devices including:
a microphone configured to pick up an audio signal; and
a wireless interface configured to communicate with at least one other handheld device via an ad-hoc network and receive at least one other audio signal having been picked up by said at least one other handheld device,
wherein at least one handheld device of the plurality of handheld devices further includes:
a display configured to display a location of each of the plurality of handheld devices and to display a location of at least one source of the audio signal and the at least one other audio signal;
a user interface configured to receive a target location from a user, the target location selected by the user from the displayed location of the at least one source; and
a microprocessor configured to:
determine position information of each of the plurality of handheld devices; and
combine the audio signal and the at least one other audio signal by:
beamforming the audio signal and the at least one other audio signal to focus on the target location;
aligning the audio signal and the at least one other audio signal to a common reference point based on the position information of each of the plurality of handheld devices; and
adding the plurality of audio signals to obtain a processed audio signal,
wherein the displayed locations of each of the plurality of handheld devices are based on the position information of each of the handheld devices determined by the microprocessor.

10. A method for determining a processed audio signal, the method comprising:
establishing an ad-hoc network between a plurality of handheld devices, each handheld device including a microphone;
determining position information for each of the plurality of handheld devices;
displaying on a display a location of each of the plurality of handheld devices based on the position information of each of the plurality of handheld devices;
picking up a plurality of audio signals with each microphone of the plurality of handheld devices;
displaying on the display a location of at least one source of the plurality of audio signals;
selecting a target location from the displayed locations of the at least one source;
receiving, in at least one handheld device, the audio signals of all other handheld devices via said ad-hoc network, the other handheld devices comprising the plurality of handheld devices excluding said at least one handheld device; and
determining, in said at least one handheld device, a processed audio signal by:
beamforming the plurality of audio signals to focus on the target location;
aligning the plurality of audio signals to a common reference point based on the position information of the plurality of handheld devices; and
adding the plurality of audio signals.

11. The method of claim 1, wherein the display is a component of the at least one handheld device.

12. The method of claim 1, wherein a user selects the target location via a touch interface.

13. The method of claim 1, further comprising:
determining position information of the source of the at least one of the plurality of audio signals, wherein
the displayed location of the source of the at least one of the plurality of audio signals is based on the determined position information of the source of the at least one of the plurality of audio signals.

14. The handheld device of claim 8, wherein the user interface is a touch interface.

15. The handheld device of claim 8, wherein the microprocessor is further configured to determine position information of the at least one source of the audio signal and the at least one other audio signal, wherein
the displayed location of the at least one source of the audio signal and the at least one other audio signal is based on the position information of the at least one source of the audio signal and the at least one other audio signal determined by the microprocessor.

* * * * *